Figure 1:
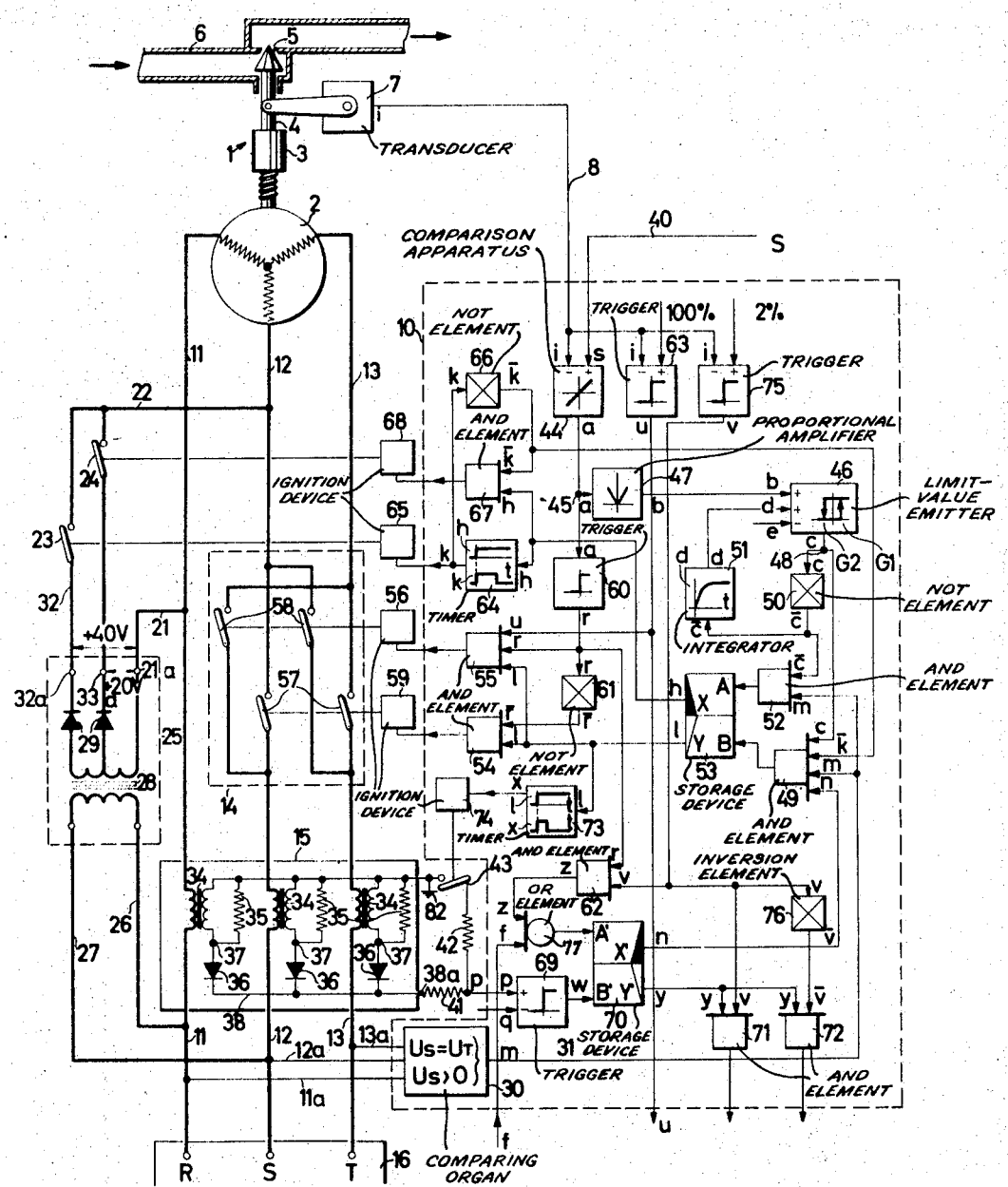

United States Patent

[11] 3,614,566

[72] Inventor  Ferdinand Konig
                Seuzach, Switzerland
[21] Appl. No. 6,530
[22] Filed     Jan. 28, 1970
[45] Patented  Oct. 19, 1971
[73] Assignee  Sulzer Brothers, Ltd.
                Winterthur, Switzerland
[32] Priority  Feb. 6, 1969
[33]           Switzerland
[31]           186/69

[54] CONTROL DEVICE HAVING MEANS FOR
     ELECTRICALLY SIMULATING AND
     COMPENSATING THE INERTIA MOMENTUM OF
     THE MOVING PARTS OF AN ELECTRICAL
     POSITIONING MEANS
     14 Claims, 4 Drawing Figs.

[52] U.S. Cl. .................................................. 318/211,
                                            318/613, 318/648
[51] Int. Cl. .................................................. H02p 3/22
[50] Field of Search .......................................... 318/211,
                        212, 611, 612, 615, 635, 648, 613

[56]            References Cited
            UNITED STATES PATENTS
3,283,230  11/1966  Davies et al. .................  318/30
3,366,856   1/1968  Sawano .........................  318/448

Primary Examiner—Oris L. Rader
Assistant Examiner—K. L. Crosson
Attorney—Kenyon & Kenyon Reilly Carr & Chapin ABSTRACT: The drive has a switching logic which includes a means for producing a correction signal in response to the switching-in of the motor. This correction signal serves to compensate for the kinetic energy of the moving parts of the drive by moving up the lower limit valve of an error signal (derived from the difference between the actual value of the adjusting element position and a fixed value) so as to permit more accurate switching-out and stopping of the motor. Other features are added to prevent overloading, premature switching-out of the motor during starting, short circuits and the like.

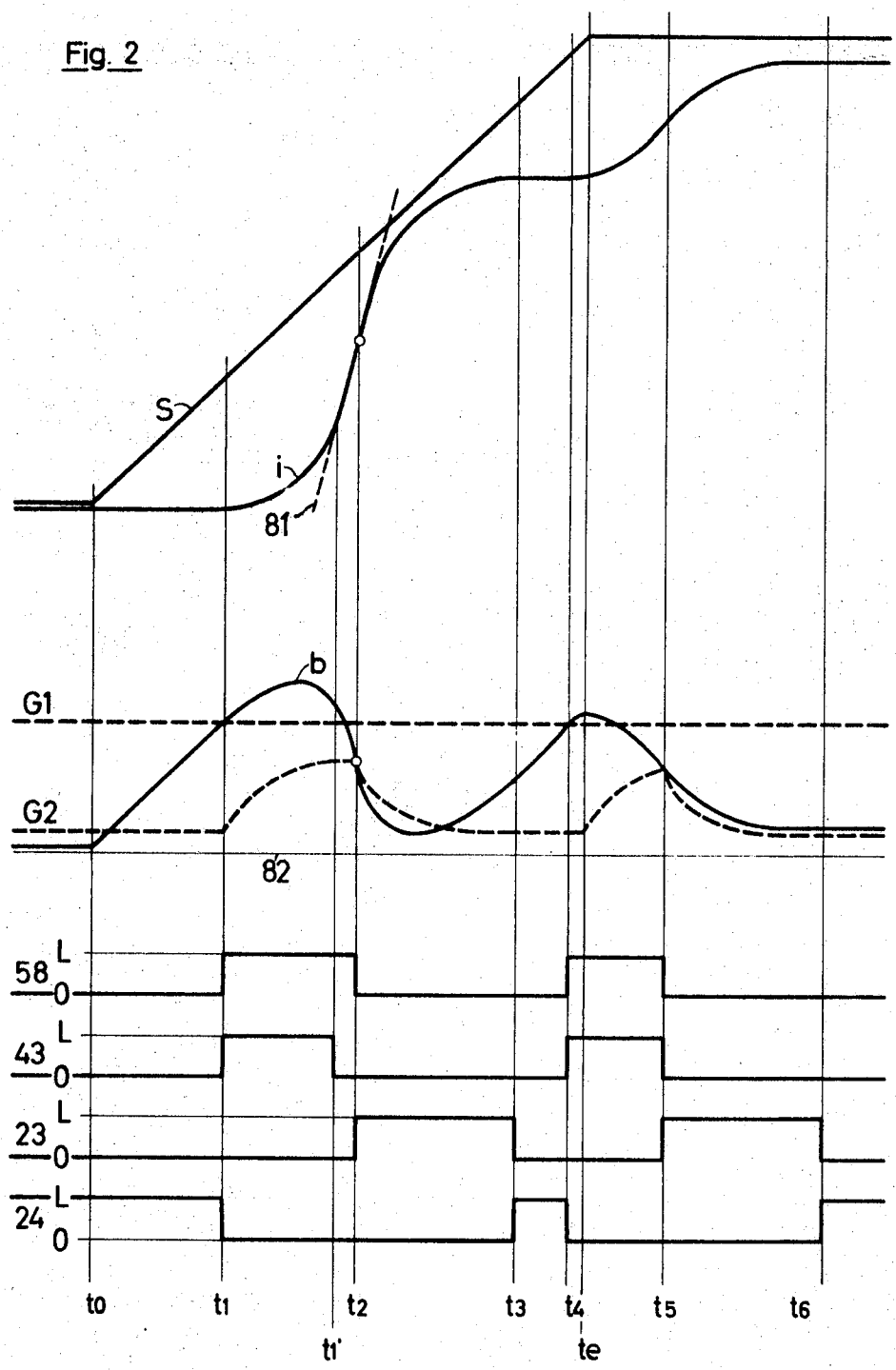

Inventor:
FERDINAND KÖNIG

BY
Kenyon & Kenyon Reilly Carr & Chapin
ATTORNEYS

CONTROL DEVICE HAVING MEANS FOR ELECTRICALLY SIMULATING AND COMPENSATING THE INERTIA MOMENTUM OF THE MOVING PARTS OF AN ELECTRICAL POSITIONING MEANS

This invention relates to an adjusting drive and more particularly, to an adjusting drive having an asynchronous motor for driving adjustable elements.

Adjusting drives have been known in which asynchronous motors have been used to drive various adjusting elements, such as valves, through the intermediary of a gearlike or hydraulic transmission. Such motors have been controlled by switching-in and switching-out the rotating field. For example, by using an error signal derived from a comparison of a desired value signal with an actual value signal of the position of the adjusting element, when an upper limit value is exceeded, the motor is switched in and when a lower limit value is fallen short of, the motor is switched out. The sign of the error signal has been used to determine the direction of rotation of the motor.

Generally, a number of requirements are simultaneously imposed on an adjusting drive, as above, for an adjusting element such as an organ or valve regulating the flow in a conduit of a steam-power plant which is driven by alternating or multiphase current. The most important of the requirements are the greatest possible accuracy of adjustment, for the purpose of keeping regulatory variations and switching frequency as low as possible; at the most, a creeping movement of the adjusting element within the range of the adjusting tolerance under the effect of static-adjusting forces, which for example originate from a medium flowing through the conduit; and, finally, high performance, that is, great torque of the motor with high adjusting speed and rapid braking, without any particular heat-overloading of the motor. The aforesaid requirements are preferably to be fulfilled in such a way that a minimum of connecting conductors are required between the control contrivance and the adjusting organ. In particular, signal conductors for the setting or positioning end switches and mechanical load-switches are to be avoided.

Accordingly, it is an object of the invention to provide the greatest possible accuracy for the adjustment of an adjusting drive.

It is another object of the invention to satisfy the remaining requirements mentioned above with various supplemental provisions.

The invention is characterized in that means are provided which, upon being made operative by the switch-in signal for the motor, produce a correction signal whose value depends on the prevailing duration of the switch-in of the motor and which reproduces the momentary kinetic energy of the moved parts and changes the lower limit value for the switch-out point of time. By means of the correction signal for shifting the switch-out point of time, and which takes into account an elimination of the mechanical inertia of the moved parts, the accuracy of adjustment of the adjusting element is substantially improved.

This result is particularly necessary in the frequently occurring cases, with adjusting elements of the aforesaid kind, in which continuous displacement of the adjusting element is necessary as the adjusting element seldom reaches its top speed. Adjusting accuracy at high speeds can be improved if a source of direct voltage with suitable switching means is provided for the braking of the moved parts. This direct voltage is superimposed on the motor stator during the switching-out of the rotating field. In addition, switchover means can be provided through which the braking direct voltage applied to the motor becomes diminished after the motor has come to a standstill. The chief result of the diminution of the braking voltage is a diminution of the danger of a heat-overload of the motor.

Furthermore, provision has to be made so that the adjusting drive, at the time of the high starting-up moment of the motor in its end positions, does not become overstressed mechanically. Therefore, a current-measuring device may be provided for the motor current in order to produce an output signal which, when an output limit value is exceeded, supplies a dominating switchout signal to the switching means, for example, consisting of controlled rectifiers (SCR), for the motor current. This measuring device, on the one hand, serves to prevent a heat-overload on the drive motor, and, on the other hand, simultaneously avoids mechanical overloading of the entire adjusting drive.

In order to make it possible to prevent a switchoff of the motor by the aforesaid arrangement during the starting-up phase, supplementary means may be provided, which may, for example, consist of a monostable multivibrator having a certain time constant, by means of which the output limit value for a predetermined time interval of the startup phase is raised.

An additional means may also be provided which is influenced by the sign and value of the actual-value signal for the adjusting element to permit an increase of the output limit value beyond the predetermined time interval. This additional means thus allows starting during a so-called "difficult startup," during which the starting-up phase becomes increased beyond the predetermined time interval through additional mechanical forces or resistances, for example, through additional friction and additional pressure forces, particularly during the lifting of a setting valve or organ off its seat when starting-up in the opening direction while preventing switching-off of the motor.

It is moreover advantageous if the output-dependent switchout signal triggers an alarm device in the event that the actual-value signal for the setting of the adjusting element does not indicate a specified end position for the adjusting element.

In order to improve the starting-up of the motor and to prevent short circuits in the motor winding between the braking and stopping voltages, respectively, and the imposed alternating voltage, and to protect the controlled rectifier used for example as a switch from overloading, a comparing organ is provided. This comparing organ compares with one another the instantaneous values of the switched phases of the alternating voltage to be switched, and triggers a releasing or freeing signal for the switch-in and switchout of the rotating field only when the instantaneous values of these phases are equal and positive.

Finally, the motor may be equipped with a controlled brake and/or self-restraining (i.e. self-locking) mechanical or hydraulic transmission. This makes it possible to relieve the motor in its stopped state to a great extent from mechanical forces, and thus serves to lower the direct current flowing through the motor so that the heat loading of the motor is lowered.

Figure 3A:
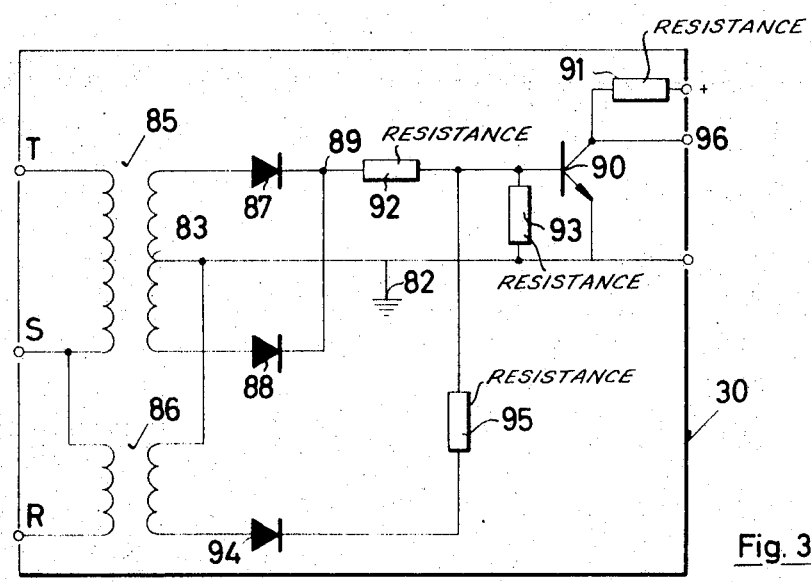
Figure 3B:
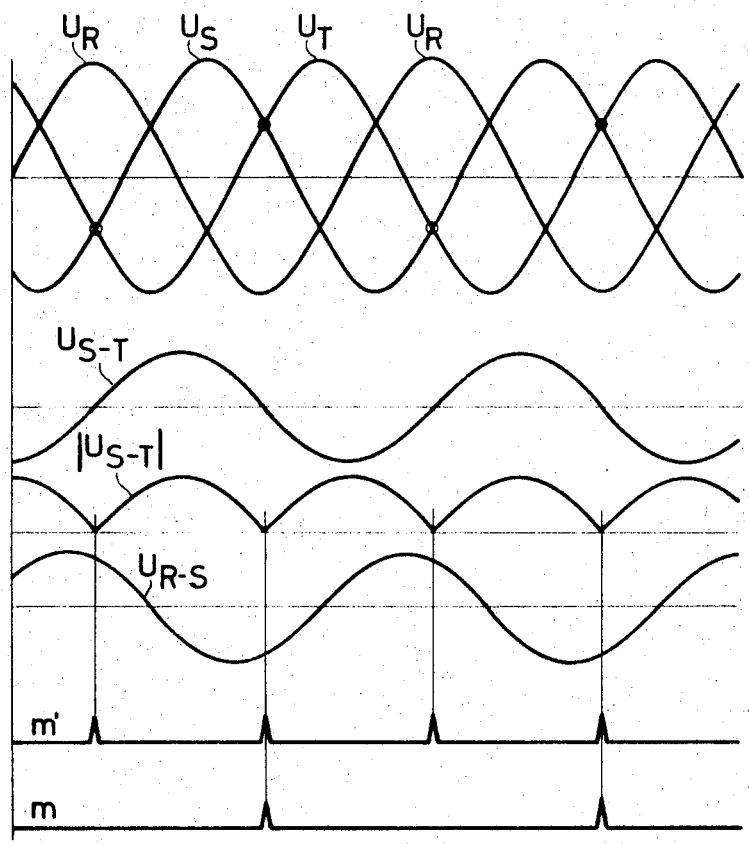

These and other objects and advantages of the invention will become more apparent from the following detailed description and appended claims taken in conjunction with the accompanying drawings in which:

FIG. 1 schematically illustrates an adjusting drive with a valve for regulating the flow-through, the associated motor, and the switching logic for controlling the motor according to the invention;

FIG. 2 graphically illustrates the manner in which the arrangement of FIG. 1 functions, as a function of time;

FIG. 3a schematically illustrates the electric circuitry of a comparing organ utilized in the arrangement of Fig. 1; and FIG. 3b graphically illustrates the manner of operation of the comparing organ.

Referring to Fig. 1, the adjusting drive 1 comprises an asynchronous motor 2, which through the intermediary of a screw-drive 3 adjusts a valve spindle 4 carrying a valve body 5 of a valve in a flow-through conduit 6. The valve spindle 4 is connected over a suitable means such as a lever with a mechanical-electrical transducer 7 such as an actual-value transmitter in order to translate the movement of the spindle 4 to the transducer 7. The transducer 7, in turn, acts over a signals conductor 8 on a switching logic 10 to deliver an actual-value signal $i$ thereto corresponding to the position of the spindle 4 and thus the flow. Electric voltages are used throughout as signals in the switching logic 10.

The asynchronous motor 2 is connected by three conductors 11, 12 and 13. Over a current-measuring device 15, directly/or by switching means 14, to a three-phase network 16. A main switch (not shown) may also be installed between the device 15 and the connected network 16.

The conductors 11, 12 are also connected directly by means of a connecting conductor 21, or by means of a conductor 22 and switching means 23, 24, with a source 25 of direct voltage, which is supplied over the conductor 26, 27 from the three-phase network 16.

The direct voltage source 25 consists, for example, of a transformer 28, at whose output direct voltages as indicated schematically, are produced through rectifiers 29. Compared with the output terminals 21a for the conductor 21, the output 32a which is connected with the conductor 22 over the conductor 32 and the switch 23 has, for example, a voltage of +40 volts. This serves for braking of the motor 2 at the switchout of the rotating field.

The voltage at output 33a which is also connected with the conductor 22 over the conductor 33 and the switch 24 is lower in comparison with that of the output 32a, and amounts, for example, as compared with point 21a, to about +20 volts. This second voltage is the lowered braking or stopping voltage for the motor 2 during standstill. As previously mentioned, the switches 23 and 24, and also the switches 43, 57 and 58, which are described below may be made as controlled rectifiers (SCR) which become ignited by pulses emitted by the switching logic 10.

The current-measuring device 15 has for each phase R, S and T of the three-phase current, a measuring transformer 34, the secondary winding of each of which is completed by a resistance 35, and has a connection to the zero or reference potential 82 of the switching logic 10. Through the intermediary of diodes 36, the potential which is dependent on the currents flowing through the resistances 35 is conducted at the points 37 in parallel to the output 38 of the measuring device 15. In this way, the instantaneous value of the voltage U38 appearing at the output point 38a is equal to the maximum value of the currents flowing at that instant in the conductors 11, 12 and 13. There will be described later the further utilization and the operation of the voltage U38 forming the output signal $p$ of the measuring device 15, and there will also be explained the purpose and the operation of the voltage-divider formed by the resistances 41 and 42, and also of a switch 43.

A comparing organ 30 is also connected to the three-phase network 16 in parallel with the motor 2 by way of conductors 11a, 12a and 13a. This comparing organ 30 produces a signal $m$, in the form of a brief voltage-pulse, which is introduced into the switching logic 10 through a conductor 31. This signal $m$ serves as a freeing signal for the switch-in and switchout of the rotating field, and is produced when, and only when, the instantaneous values of the voltages of both the phases S and T which are to be switched are equal and positive. The construction and operation of the comparing organ 30 are described below in connection with Figs. 3a and 3b.

The switching logic 10 wherein the signals flow-diagram is shown by the usual symbolic representation and which is mainly made with elements known in digital technology, has a desired-value signal $s$ supplied thereto through a signal-conductor 40. This signal $s$ together with the actual-value signal $i$ act on an apparatus 44 for comparing the desired and actual vale signals. In this comparison apparatus 44, an error signal $a$ is formed from the difference between the two input magnitudes $s$ and $i$, and flows to the branch point 45. From this point 45, the error signal $a$ goes to a proportional amplifier 47 of known design, which forms the absolute value $b$ of the error signal. The absolute value signal $b$ then flows to a limit-value emitter 46 having a hysteresis element of known design.

The limit-value emitter 46 in the present control circuitry first performs a conversion of the signals $a$ and $b$, previously formed as analog signals at the input, into a digital output $c$ and then operates in such a way that in the case of a rise of the input signal while exceeding a first higher limit value G1, the output signal $c$ jumps from O to L. The output signal $c$, however, jumps back from L to O only when a second lower limit value G2 is fallen short of. The pattern of the output signal $c$, as a function of the algebraic sum of the input signals $b$, $d$ and $e$, therefore has the form shown in Fig. 1 of a hysteresis loop, from which is derived the designation of this known switching element 46.

The other input signals supplied to the limit-value emitter 46 are a predetermined negative limit-value signal $e$, which influences the magnitude of the limit value G1 needed for the appearance of an output signal $c$, and a positive correction signal $d$ which depends on the prevailing switch-in duration of the motor 2. This signal $d$ takes into account the kinetic energy of the moved parts of the adjusting drive. The signal $d$ is triggered by the output signal $c$ of the signal-emitter 46, which signal in turn becomes branched at a point 48, and on the one hand flows to an AND element 49, and on the other hand flows by way of a NOT or inversion element 50 of known design as a signal $\bar{c}$ ("not $c$ "or "$c$ inverse") to an RC element 51 acting as an integrator. The signal $\bar{c}$ from the inversion element 50 also arrives at another AND element 52.

The RC element 51 acts in the present control circuitry so that at the occurrence of a $\bar{c}$ signal at its input, the signal $d$ becomes integrated as a chronological integral of this appearance of $\bar{c}$ up to its limit value, which is determined by the magnitude of the resistance R and of the capacity $c$ thereof.

Through this, the signal $d$ keeps its positive maximum value so long as there is no output signal $c$ from the limit-value emitter 46, which forms one of the switch-in requirements for the rotating field, as will be described farther on.

At the appearance of the signal $c$, the input signal $\bar{c}$ at the input of the RC element 51 vanishes, and this element's condenser begins, in accordance with the familiar pattern of condenser discharging, to become discharged. The sum of the two positive inputs $b$ and $d$ of the limit-value emitter 46 thereby becomes smaller, dependent on the prevailing switch-in duration for the motor 2, depending, that is, on the duration of the signal $c$. Because the signal $b$ has become retrogressive in magnitude, through the switching-in of the motor 2, the input signal of the limit-value emitter 46, as the sum of the signals $b$, $d$ and $e$, become smaller, until upon reaching the limit value G2 the motor, through the vanishing of the switch-in requirement $c$, becomes switched out. G2 hereby becomes reached the more rapidly the farther the condenser of the RC element has become discharged. Through this, however, the limit value G2, and thus the switchout point of time for the motor 2, becomes shifted to the right in the graph dependent on and with the increasing duration of switch-in, relative to its value at maximum signal $d$. This measure increases the accuracy of adjustment substantially for the adjusting drive 1, because the kinetic energy existing in the moved parts is taken into account during the braking of the motor 2.

It should furthermore be mentioned that a conversion takes place in the RC element 51 of the digital input signal $\bar{c}$ into an analog signal $d$, which is made regressive in the limit-value emitter 46. The function $d = f(t)$ shown in the symbol of the RC element 51, is, as is the general custom, represented for a pattern of the output signal *with a unit-jump of the input signal $\bar{c}$ at the zero point.*

The two AND elements 49 and 52 act on a storage device 53, for example a bistable circuit flip-flop of known design. This storage 53, with two inputs A and B and two outputs X and Y, has a definite switch-in arrangement; that is, with a switchon of its supply voltage, the device 53 is set into the basic position (as shown) in which an output signal $h$ appears at the output X.

In order to set the storage device 53 into its other position, it is necessary that a signal appear at input B. Such a signal appears as soon as all four switching requirements appear at the input of the AND element 49. Together with the signal $c$, these requirements are a signal $\bar{k}$ which indicates that the motor 2 is at a standstill, a signal $m$ that indicates that in the comparing organ 30 the condition $U_S=U_T>0$ exists, and a signal $n$ which appears as an output signal from a second storage device 70 of similar design when the device 70 is reset through its input $A'$ into that position which gives a signal at its output $X'$.

Aside from the switchon of its supply voltage, the storage device 53 is reset into the basic position through an output signal from the AND element 52 applied to its input A, whereby for the appearance of this input signal conditions $\bar{c}$ and $m$ have to be fulfilled.

The signal 1 at the output Y from the storage device 53 arrives at two AND elements 54 and 55, whose output signals act, through the intermediary of ignition devices 56, 59 on rectifiers 57, 58 in the switching means 14 which serve as switches, in the conductors 12, 13 and thus effect a switch-in of the rotating field either in the closed direction (AND element 54, ignition device 59 and switch 57), or in the opened direction (AND element 55, ignition device 56 and switch 58) of the valve 5.

The ignition of one or the other of the two switches 57, 58 depends on the sign of the error signal $a$. A trigger 60, at whose input there appears the analog error signal $a$ coming from the branch point 45, forms a signal $r$ reproducing the sign of the signal $a$. The output signal $R$ at its digital output appears only when the sign of the error signal $a$ is positive; that is, when the desired value $s$ at the input of the comparison device 44 is greater than the actual value $i$. The sign signal $r$ arrives, as a second switching condition at the AND element 55 for the switch-in of the motor 2 in the opened direction of the valve 5. Furthermore, the signal $r$ is, through the intermediary of a NOT element 61, conducted as signal $\bar{r}$ to the AND element 54 as a second input signal for the switch-in of the motor 2 in the opposite direction. Finally, the signal $r$ is also fed to another AND element 62, whose function will be described below.

A third switching condition is also imposed on the AND element 55 for the ignition of the switch 58. This third signal $u$ is formed in a trigger 63 as a digital output signal so long as there has not appeared at its input an actual value signal $i$ of a fixed desired value that corresponds to a 100 percent opening of the valve 5. The function of the signal $u$ is to prevent a startup of the motor 2 in the opening direction in the event that the valve 5 is already fully open. The signal $u$ furthermore arrives at an indicating instrument (not shown) which at the vanishing of this signal $u$ and indicates the valve position as being "100 percent open."

As has already been described, the storage device 53 with the presence of a signal at its input A is reset into a definite switchon or basic position. Through this, however, the signal 1 at the output Y vanishes thus causing either switch 57 or 58 to be opened; that is, the controlled rectifier 57, 58 becomes extinguished because of the alternating voltage applied thereto.

The signal $h$, which appears at the output X of the storage device 53 in the basic position, serves to switch in the braking voltage for the motor 2. This signal $h$ arrives, by way of a timing element 64, as a signal $k$ at an ignition device 65 for the controlled rectifier or switch 23, through which the braking voltage U23 of about 40 volts becomes switched to the motor 2. The timing element 64, constructed as a monostable multivibrator of known design, at the appearance of an input signal $h$ produces an output signal $k$, which either in the presence of an input signal $h$ vanishes after a certain time or else vanishes simultaneously with the vanishing of the signal $h$. For this reason, the patterns of the input signal $h$ and of the output signal $k$ of the timing element 64 are plotted in Fig. 1 as a function of time. The time constant; that is the duration of the output-signal pulse $k$, is hereby established so that a signal $k$ exists until the motor 2 has been braked from its maximum attainable speed to a standstill. This duration of the signal pulse $k$ is always sufficient to brake the motor 2 when the motor has only reached some lower speed.

The signal $k$ appears simultaneously at a NOT element 66, so as then to arrive as a signal $\bar{k}$ at the AND element 67. The signal $\bar{k}$ also is transmitted to the AND element 49 to form a condition for the setting of the storage device 53 out of the basic position and thus to form the switch-in condition for the motor 2, to brake the motor 2 to a stop before starting up again. At the AND element 67, the signal $\bar{k}$, together with the signal $h$, forms the switchon condition for the switch 24, by means of which, through the intermediary of the ignition device 68, the diminished direct or holding voltage U24 becomes switched to the motor 2 after the motor has come to a standstill.

The relatively short time during which the entire braking voltage U23 is applied to the motor 2, and the following transition to the lower holding voltage U24, protect the motor 2 against heat-overloads during a standstill of the adjusting element 5. Upon the vanishing of the signal $h$, at the instant of the switch-in anew of the rotating field, the switch 24, through the alternating voltage of the rotating field reaching it, becomes automatically extinguished, so that the holding voltage at that instant becomes switched off from the motor 2.

As has been mentioned, the current-measuring device 15 serves to protect the motor 2 against excessive current. To this end, the potential U38 appears at the point 38$a$ as an output signal $p$ from this device. This signal $p$ is fed, as an analog input signal, to a trigger 69, at whose digital output a signal $w$ appears as soon as the positive signal $p$ exceeds a second negative input signal $q$ which represents the maximum allowable current $I_{max}$ for the motor 2. The output signal $w$ of the trigger 69 arrives at the input B' of the second storage device 70 which is constructed similarly to the storage device 53.

By means of the signal $w$ at the input B; the storage device 70 is set out of the illustrated switchon or basic position into a second stable position, in which an output signal $y$ appears at an output Y'. This signal $y$ is fed to two AND elements 71 and 72.

The setting of the storage device 70 brings about a vanishing of the signal $n$ at the storage output X', and thus a vanishing of one of the four switch-in conditions or requirements at the AND element 49, which initiates a tilting of the storage device 53, and thus a switching-in of the rotating field. In this way, that is through the vanishing of the signal $n$, a dominating switchout signal is give for the rotating field by the current-measuring device 15 as soon as the device 15 measures an excessive current for the motor 2.

As is well known, during starting-up phase a motor needs a greater current. This is taken into account in that, by transmitting the switch-in signal 1 to a timing element 73, designed similarly to the timing element 64 but having a shorter duration of pulse for its output with the existence of an input signal 1, the switch 43 is actuated through the intermediary of an ignition device 74. Through this, for the duration of the pulse of the output signal $x$ of the timing element 74, the signal $p$ at the input of the trigger 69 becomes divided through the voltage dividers 41 and 42 in proportion to these resistances, so that for this length of time the input signal $p$ of the trigger 69 is artificially diminished. This ensures that during the starting-up phase a current which exceeds the desired value $I_{max}$ can flow through the motor 2.

In the particular case of a closed valve 5, the prescribed time interval of the starting-up phase may not suffice to move the valve in the desired direction during the starting-up in the opening direction when there is a so-called "difficult start." Therefore, for this case, the startup phase can be lengthened so as to prevent a switching-out of the rotating field by the current measuring device 15. To this end, a trigger 75 with a digital output is actuated from the actual-value signal signal $i$ and a fixed desired-value signal "2 percent." The output signal $v$ of the trigger 75 appears as soon as the actual-value signal $i$ reaches the fixed desired value "2 percent." The term "2 percent" has been selected as an allowable tolerance range for the indication "valve closed," because it is difficult to determine the exact value "0 percent." Within the range from 0 to 2 percent, the valve 5 is therefore regarded as being closed, so long as the storage device 70 gives a signal y at its output Y.

The signal v arrives at the AND element 62 and together with the signal r reporting the sign for starting up in the opening direction, makes possible the appearance of a signal z at the output, which signal is transmitted to an OR element 77. By means of this OR element 77, having another input to which a "reset" signal is supplied by a manual key (not shown) an input signal is supplied to the input A' of the storage device 70. This input signal serves to hold the storage device 70 in its basic position or serves to reset the storage device 70 into that position. Because of the special design of the storage device 70, an input signal at the input A' in any event provides an output signal n at the output X', independently of whether a signal w is or is not present at the same time. This, however, in the first place allows by means of the manual key (not shown) the control arrangement, and thus the motor 2, to become operative again, for example, after a derangement. In the second place, a switching-out during "difficult starting" is prevented during the presence of a signal z. This means that so long as the valve is in its closed region of $\leq 2$ percent, and a sign signal r is given for starting-up in the opening direction, a signal n is present, and in spite of excess current, the motor 2 does not become switched out.

The signal v moreover arrives at the AND element 71, whose output signal, in the case of the simultaneous presence of the excess-current signal y at the output Y' of the storage device 70, arrives at an indicating device (not shown) for indicating "valve closed." The signal v is also passed to the inversion element 76 and becomes inverted for transmission as the signal $\bar{v}$ at the AND element 72. If, at the input to the AND element 72 there are simultaneously present the signals v and y, that is, if excess current is indicated for the motor 2, without the valve 5 being in its $\leq 2$ percent closed range, then the output signal of this AND element 72 operates an alarm device (not shown) of an optical or acoustic nature, for the purpose of indicating that a derangement exists in the adjusting drive.

The adjusting drive as shown functions, for example, as is shown graphically in Fig. 2. That is, over a time axis, up to the instant $t_o$, the adjusting drive 1 is at rest so that the desired value s deviates, for example, by a small amount from the actual value i. From the instant $t_o$ onward, the desired value s ascends on a slope to the instant $t_e$, after which the signal s is again fixed. The error signal a or b, whose zero line is designated 82, ascends correspondingly from the instant $t_o$ until reaching the limit value G1 at the instant $t_l$. The limit-value emitter 46 at that instant emits an output signal c, which, in the event that signals $\bar{k}$ and n are present, at the instant of the appearance of a freeing signal m, coming from the comparing organ 30, by the aid of the AND element 49 sets the storage device 53, and thus releases a signal 1.

When there is fulfillment of the other switching conditions (sign signal r and signal u), the output signal of the AND element 55 by means of the ignition device 56 ignites the switch 58. The asynchronous motor 2 then runs in the opening direction. After a short time, the motor 2 reaches the full speed of stroke corresponding to the straight line 81 at $t_{1'}$.

With the appearance of the signal c, the RC element 51 begins to discharge in the described manner, and shifts the limit value G2 upward, and in this case namely as far as its upper end-value, because the motor 2 reaches its maximum speed.

The difference between the actual value i and the desired value s becomes diminished because of the travel of the valve body 5 to its desired value, until the difference falls short of the limit value G2. At this instant, $t_2$, the signal c vanishes; and at the appearance of the next signal m the storage device 53 is reset to its basic position; the switch 58 becomes switched out, and at the same time, the direct voltage switching means 23, through the newly appeared output signal h, of the storage device 53 is switched on for a length of time dependent on the timing element 64. After the expiration of this time, the switching means 23 opens, while the direct-voltage switching means 24 closes because of the presence of the signals $\bar{k}$ and h.

Because of the appearance of a direct-voltage at two terminals of the asynchronous motor 2, the motor 2 becomes braked hard until stopping at the instant $t_3$. Following this, the motor 2 is held against running by means of the diminished direct voltage supplied through the switching means 24 while the heat-loss output of the motor 2 is carried off through dissipation without any unallowable rise in temperature.

Because the desired value s is still increasing, the magnitude of a, i.e. signal b again increases, until, at the instant $t_4$, the three-phase switch 58 becomes switched in a second time in the described manner. At the instant $t_5$, which has in Fig. 2 been chosen in such a way that the motor at that time has still not reached the top speed of stroke, the three-phase switch 58 again becomes switched off, because the error signal b at this instant (not having reached its maximum value) falls short of the limit value G2. At the instant $t_5$, the motor 2, as has already been described, is braked in two stages with direct voltage and held still so that at time $t_6$ a small regulatory deviation is once more obtained between the actual value i and the desired value s.

Below the graphs of the signals i and s and of the signal b, respectively there are plotted in Fig. 2 the switching positions of the switches 58, 43, 24 and 23, for the various instants of time $t_o$ to $t_6$ that have been described. The switchon conditions of the said switches are hereby designated by the symbol L, and their switchoff states by the symbol 0.

Fig. 3a shows the electrical circuitry for the comparing organ 30, through which the pulselike signal m is given to the two AND elements 49, 52 at the instant of the transmission of the corresponding switch-in and switchout signals for the rotating field. The requirement for the appearance of a signal m is that the two-phase voltages $U_S$ and $U_T$ be equal; that is, their potential difference $U_{ST}$ from one to the other is equal to zero. In addition, $U_S$ and $U_T$ should be positive. Thus, negative values $U_S = U_T < 0$ are not used for releasing a pulse m.

The function of the comparing organ 30 is to make possible a switch-in or switchout of the rotating field only at instants that result from the aforesaid coincidence of $U_S$ and $U_T$ and the supplementary condition "positive," for the purpose of preventing short-circuits due to defective ignition and overloadings of the rectifiers which are used and controlled as switches.

The two phases S and T are fed through the conductors 13a, 12a (Fig. 1) to the primary winding of a transformer 85, while the phase R is connected, through a conductor 11a and the primary side of another transformer 86, with the phase S. The secondary side of the transformer 85 is completed by two diodes 87, 88, so that at a point 89 the absolute value $|U_{ST}|$ of the potential difference $U_{ST}$ appears, having only positive half-waves. This absolute value serves as the control voltage at the base of an NPN transistor 90. This transistor 90, has, through a resistance 91, its collector at a positive potential relatively to its emitter. The emitter in its turn is connected with a middle tap 83 of the secondary winding of the transformer 85. The middle tap 83 in turn is at the reference potential 82 of the complete arrangement. A pair of resistances 92, 93 form a voltage divider for the voltage $U_{ST}$.

The secondary winding of the transformer 86 is connected in parallel, by way of a diode 94 and a resistance 95, to the base-emitter section of the transistor 90. At its output there appears the alternating voltage $U_{RS'}$ of which, because of the diode 94, only the positive half-waves arrive at the base of the transistor 90. The desired signal m appears at the output 96 of the switching arrangement and flows to the two AND elements 94 and 52.

The way in which the comparing organ 30 operates as shown in Fig. 3a, is as follows: so long as the potential of the transistor base is positive, this transistor 90 is conductive and its output 96 is at approximately the potential of the middle tap 83, that is, at the zero potential of the complete arrangement. A signal at the output 96 can therefore not appear during this time.

If the effect of the voltage $U_{RS}$ is disregarded, then, from what has been said in the foregoing, an output signal $m'$ becomes produced when no positive potential is applied to the transistor base, which is the case for $|U_{ST}| \approx 0$, that is when $U_S = U_T$, whether positive or negative.

The emission of the signal $m'$ for the transmission as the desired signal $m$ occurs only for $U_S = U_T > Q$, by the aid of the half-wave $U_{RS}$, which are applied as positive voltages, that is, as voltages which move the output 96 to zero potential when pulses $m'$ occur as a result of $|U_{ST}| = 0$ for $U_S = U_T > 0$.

Because the negative half-waves of $U_{RS}$ do not appear due to the diode 94, there are obtained as desired, at output 96 signals $m$ for $U_S = U_T > 0$.

Fig. 3b shows, as a function of the time $t$, the relative phase positions and the pattern of the voltages $U_R$, $U_S$ and $U_T$; $U_{ST}$; $|U_{ST'}|$; $m'$; $U_{RS}$ and $m$. In the representation of the three phases R, S and T, solid dots indicate the instants for the signals $m$, and small circles indicate the instants for the suppressed signals $m'$.

It should also be mentioned that the invention is not limited to the described example. It is, for example, possible to also make the switching logic 10 as a control in analog technique, or, for example, to replace the controlled rectifiers by mechanical switches controlled from a solenoid. The asynchronous motor 2 may moreover be driven by single-phase or two-phase alternating current, instead of by three-phase current.

What is claimed is:

1. A positioning drive for moving an element to be positioned having an asynchronous motor with a rotating field for moving said element, switching means for switching in and switching out said rotating field of said motor, and means for comparing an actual value signal corresponding to the position of said element and a desired value signal corresponding to a predetermined value to produce an error signal corresponding to the difference between said value signals whereby with the sign of said error signal determining the direction of rotation of said motor, said rotating field is switched in in response to said error signal exceeding an upper limit and switched out in response to said error signal falling short of a lower limit characterized in having a means (51) for producing a correction signal (d) in response to the switching in of said rotating field of said motor of a value corresponding to and simulating the momentary kinetic energy of the moved components and depending on the prevailing duration of the switch-in of said motor to shift said lower limit for the switching-out point of time of said rotating field of said motor in a direction towards an earlier switchout with an increasing duration of the switch-in of said motor.

2. A positioning drive as set forth in claim 1 wherein said motor has a stator and which further includes a source of direct voltage and a switch means for switching said source to said stator in response to switching-out of said rotating field of said motor to brake said moved parts.

3. A positioning drive as set forth in claim 2 further including means for diminishing the direct voltage supplied to said stator after said motor stops.

4. A positioning drive as set forth in claim 1 further including a current-measuring device for measuring current supplied to said motor and producing a performance signal in response thereto and means for producing a dominating switchout signal in response to said performance signal exceeding a predetermined limiting value for activating said switching means to switchout said rotating field of said motor.

5. A positioning drive as set forth in claim 4 further including means for raising the value of said limiting value for a predetermined period of time during starting-up of said motor.

6. A positioning drive as set forth in claim 5 further including means responsive to the sign and magnitude of said actual value signal for allowing the raising of said limiting value beyond said predetermined period of time.

7. A positioning drive as set forth in claim 5 further including an alarm device responsive to a switching-out signal of said switching means upon said actual value signal indicating a predetermined end position of said adjusting element being exceeded.

8. A positioning drive as set forth in claim 1 wherein a means is connected to said motor and said switching means to supply one of two phases of alternating current to said motor, and which further includes a comparing organ for comparing momentary values of said two phases and emitting a freeing signal to said switching means in response to said momentary values being equal and positive.

9. A positioning drive as set forth in claim 1 wherein said motor has a controlled brake.

10. A positioning drive as set forth in claim 1 further including a transmission between said motor and said adjusting element.

11. A positioning drive as set forth in claim 10 wherein said transmission if self-locking.

12. A positioning drive for controlling the operation of an asynchronous motor driven over a single or multiphase alternating voltage source, said motor being connected to an element to move said element; said positioning drive including a switching logic connected between said voltage source and said motor to selectively switch-in and switchout said motor to said voltage source, said switching logic having a means for emitting an error signal in response to a difference between an actual value signal corresponding to the position of said element and a predetermined desired value signal, means responsive to said error signal exceeding an upper limit value for switching in said motor and to said error signal falling short of a lower limit value for switching out said motor, and means responsive to a switching-in of said motor for producing a correction signal depending on the prevailing duration of the switching-in of said motor and representing the momentary kinetic energy of said motor and element to increase said lower limit value towards said upper limit value while increasing the duration of the switch-in of said motor.

13. A positioning drive as set forth in claim 12 wherein said latter means is an RC element acting as an integrator, wherein the condenser thereof is charged during the switch-out of said motor and discharged upon switching-in of said motor.

14. A positioning drive as set forth in claim 12 wherein said latter means is an integrator, wherein the condenser thereof is charged during the switchout of said motor and discharged upon switching-in of said motor.